July 2, 1935. A. W. MORTON 2,006,902
PACKING RING
Filed May 15, 1934 2 Sheets-Sheet 1
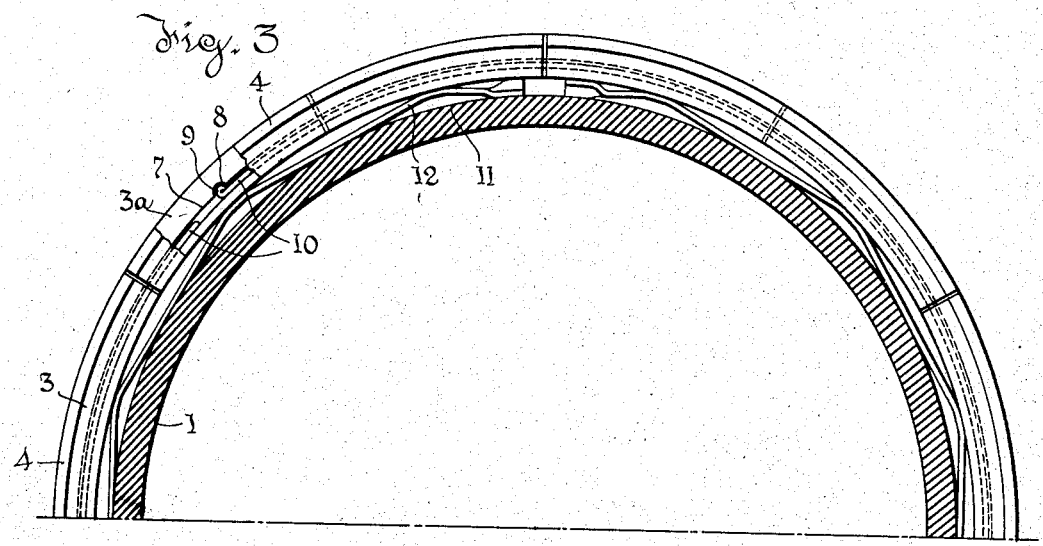
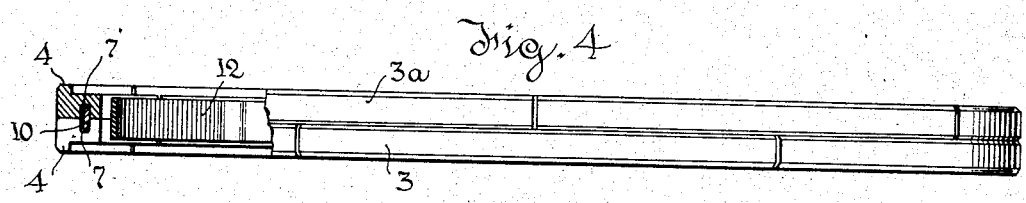
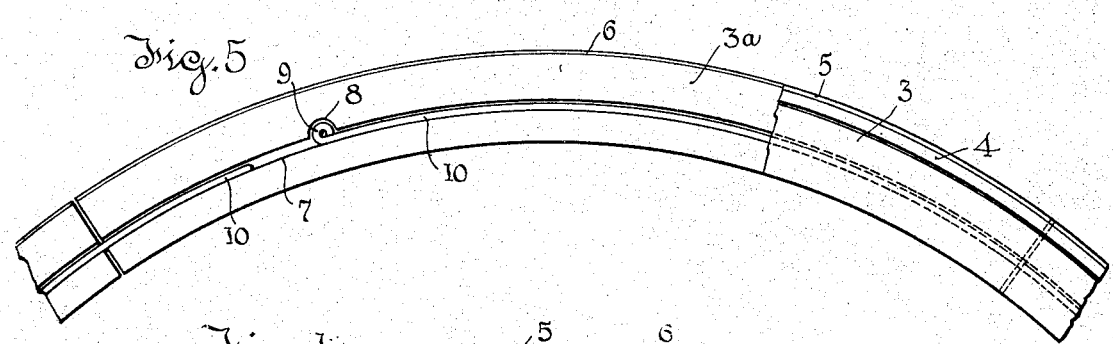
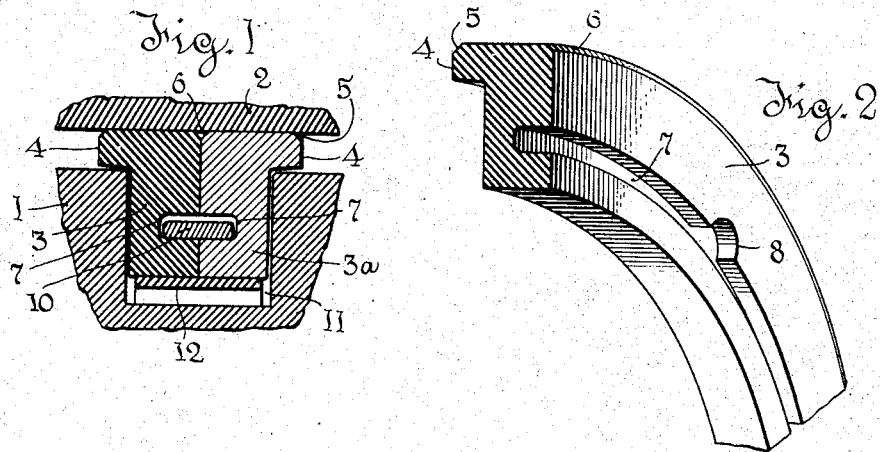
Inventor:
Allen W. Morton
Attorneys

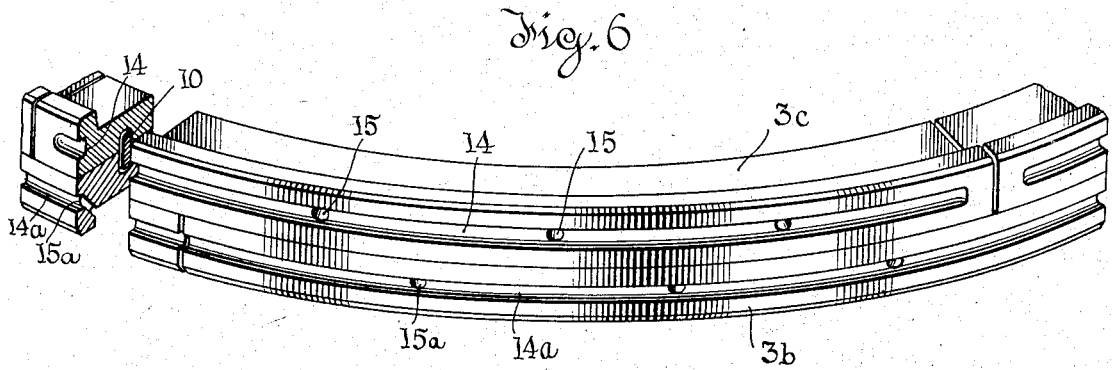
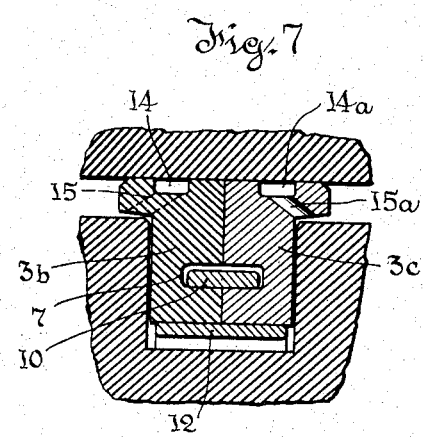 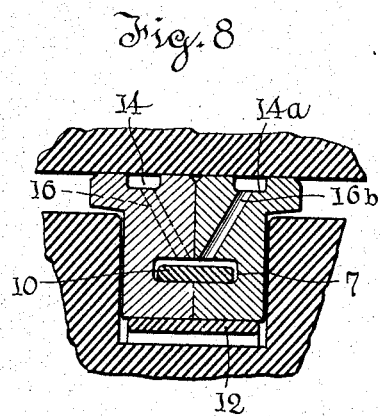
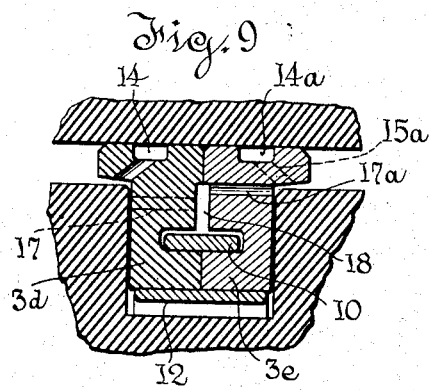 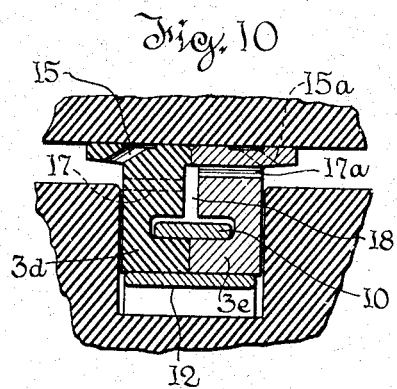
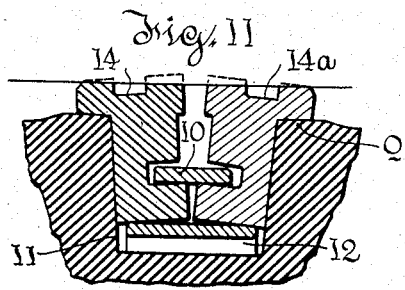

Patented July 2, 1935

2,006,902

UNITED STATES PATENT OFFICE 2,006,902

PACKING RING

Allen W. Morton, Baltimore, Md., assignor, by mesne assignments, to The Bartlett Hayward Company, Baltimore, Md., a corporation of Maryland Application May 15, 1934, Serial No. 725,817

11 Claims. (Cl. 309—29)

This invention pertains to packing rings, and while more particularly designed for use in engines employing steam as a motive fluid, it may to advantage be used in other engines and in other relations as well.

The main object of the invention is to produce a ring which, while it may be readily positioned within the ring grooves of a piston, is likewise durable and effective in service.

A further object is to provide a ring produced from two series of segments standing facewise with the segments of each series standing end to end, there being means for forcing the segments outwardly into cylinder-contacting position, together with means for restraining the segments from rolling out of position as sometimes obtains with rings of commerce when a piston groove becomes worn.

A still further object of the invention is to loosely interconnect or relate the two adjacent series of segments which go to form the ring in such manner that while the segments are free to move in a radial direction, as well as laterally as a whole or in reference to one another, still they are restrained to such an extent as to prevent undue displacement of such segments with reference to each other and to the piston groove in which they are mounted.

The innermost side face of each segment is formed with an arcuate groove concentric with the axis of the segment. Inasmuch as the segments are alike in form throughout, when they are assembled a continuous groove is produced in each series of segments which grooves stand opposite each other, forming in effect a continuous annular channel extending throughout the ring body.

In a segment of each series, there will preferably be formed an opening or recess extending laterally from the groove designed to receive the head or enlarged end of a restraining band or element, which latter is mounted in and extends throughout the channel formed by the grooves. The recesses are preferably so located that the head which interlocks the adjacent segments together will cause the segments of one series to break joint with those of the opposite series. This interlocking of the parts prevents relative rotative movement of the segments with reference to each other and to the restraining band.

The restraining band or ring is of such width as to extend into the grooves of the opposed segments which form the continuous channel, and is produced from soft annealed steel or other material which has essentially no spring action.

Clearance is provided between the restraining band and the walls of the channel formed by the grooves. This permits a spring which underlies the segments to move the segments independently to such an extent as to maintain them in effective contact with the cylinder. Again, provision is made in certain of the forms hereinafter described to equalize the fluid pressure upon the ring structure.

Several embodiments of the invention are disclosed in the annexed drawings, in which:—

Figure 1 is a sectional view of a packing ring in a groove of a piston, showing sections of the piston and cylinder broken away;

Fig. 2, a perspective view of a part of one of the segments employed in making up the ring;

Fig. 3, a side elevation of a portion of the ring, parts being broken away and the pison shown in section;

Fig. 4, an edge view with parts shown as broken away;

Fig. 5, a side elevation of the ring with parts broken away to more fully disclose a segment retaining element which is employed in conjunction therewith;

Fig. 6, a perspective view of a portion of a ring illustrating a modification of the invention;

Fig. 7, a transverse sectional view thereof;

Fig. 8, a like view of a slightly modified form;

Fig. 9, also a like view illustrative of a further modification;

Fig. 10, a view of the ring of Fig. 9 after the cylinder-contacting surface thereof has become worn; and Fig. 11, a transverse sectional view showing a ring, of my invention positioned in a groove which has become flared and the outer surfaces of the segments where they are worn away being shown in dotted lines.

The invention will be described in connection with a piston and cylinder.

Referring first to Figures 1 to 5, both inclusive, I denotes so much of an engine piston as is necessary to an understanding of the invention, and in which there is formed a ring-receiving groove. The cylinder in this instance is indicated by 2 (Fig. 1). The ring segments will preferably take the form shown in the figures above alluded to, and as best seen upon reference to Figs. 1 and 2. They may be said to be arcuate in outline, the body 3 whereof is provided with a laterally extending lip or flange 4, the under face whereof inclines upwardly toward the outer edge of the flange. The upper edge of the flange and the upper edge of the body may be beveled as at 5 and 6, respectively, although such is not of the essence of the invention. So, too, as will hereinafter appear, the flanges upon the segments may be omitted, insofar as the broad invention is concerned.

In that face of the body 3 opposite the flange 4 there is formed a groove or channel 7 conforming in curvature to that of the segment as a whole, or in other words, is concentric with the center upon which the segment is formed. When the segments are assembled in facewise relation, the grooves in the oppositely disposed series which series are denoted generally by 3 and 3a, stand in juxtaposition and form what may be termed a continuous channel which extends throughout the entire ring body.

There is formed in one segment of a series, an opening or recess 8, indicated as extending upwardly from the channel 7, and the corresponding segment of the opposite series will have a like recess to receive the head 9 of a restraining band or element 10 which is placed within the channel when the parts are assembled. This restraining element extends approximately the entire distance around the ring with its free end stopping short of the head 9 (Figs. 3 and 5).

The ring groove in the piston is denoted by 11 (see more particularly Figs. 1 and 3), and is of such dimensions as to receive the body of the segments of the ring, the undercut or inclined face of the flange 4 projecting upwardly to a slight extent from the adjacent wall of the piston.

Located within the bottom of the ring groove is an expander spring 12 which preferably is formed from flat sheet metal having a contour such as is shown in Fig. 3, that is to say, portions which contact the underface of the ring segments separated by longer faces or portions which bear against the bottom of the ring groove. The ends of the spring 12 (see Fig. 3) are twisted in opposite directions in the plane of the body, so that points or edges will be presented that will catch in the space between a pair of adjacent ring segments and prevent relative rotation between spring and ring segments.

In this manner, spring 12 will be kept from unduly wearing the inner face of the segments, and likewise the wear upon the spring itself will be minimized. A spring without such twisted ends may, of course, be employed.

Under the arrangement above set forth and described, the ring segments will find a fair bearing against the cylinder wall, the spring 12 urging the same outwardly toward the wall at all times. The restraining member serves to prevent the segments from moving outwardly generally independently of each other, or in other words, acts to hold them against independent outward movement throughout each series and throughout the ring.

It is common practice for rings to wear away to such an extent that the flanges are completely worn off, and when this obtains the spring 12 has a tendency to push the rings or ring segments out of the groove. The restraining member 10, however, prevents this and the rings continue to function though, of course, not to the same extent as where they have a full bearing surface. The tapering of the under surface of the flange 4 prevents this surface from contacting and rubbing against the periphery of the piston adjacent the groove, when the grooves become flared and the ring has a tendency to wedge sidewise. Not only do the grooves become flared in pistons but they are, in a sense, hammered outwardly, as indicated at o in Fig. 11, at and adjacent the outer edges of the groove, so that the piston rides on the flanges at this point and tends to break them off. However, by reason of the tapering, this breakage is minimized.

Moreover, by reason of the beveling of the under face of the flange 4, steam may enter more readily beneath the flange and act to force the ring segments outwardly.

In Figs. 6 and 7, a slight modification is shown. In this instance, the segments of the two series which go to make up the ring are denoted by 3b and 3c, respectively, and they are provided with arcuate slots 7 in the adjacent side faces to form a channel to receive the restraining ring as 10, as above set forth.

Beneath them and taking against the bottom of the ring groove is the expander spring 12 of the form heretofore described. The parts so far described are the same as those shown and referred to in the other figures. In this instance, each of the segments of the ring is provided with a groove or channel in its cylinder-contacting face, such channels being denoted by 14 and 14a, respectively, which, as will be seen upon reference to Fig. 6, are shown as stopping short of the ends of the segments, in the uppermost series in said figure, thus preventing passage of steam therefrom to the adjacent joints.

On the other hand, as shown in the lower series in said figure, the channels may extend to each end of each of the segments, forming in effect a continuous channel when the segments are assembled.

Extending through the flanges of the segments is a series of openings 15, 15a, said openings terminating in the grooves 14, or 14a, as the case may be, and the lower face of the flanges. In this manner, substantial equalization of pressure is obtained upon different surfaces of the ring, inasmuch as the steam passing below the beveled surface of the flange may enter the grooves 14, 14a, through the openings 15, 15a.

Insofar as the spring and the restraining band are concerned, the action is the same as that above described.

In Figure 8, a further modification is shown wherein openings or conduits 16, 16b extend from grooves formed in the cylinder-contacting face of each segment, similar to those described in connection with Figs. 6 and 7, and terminating at their inner ends in the channel formed by the oppositely disposed arcuate grooves which produce the channel for the segment retaining element. Here, again, said element acts as before described and the expander spring 12 is present.

In Figs. 9 and 10, a still further modification is disclosed.

In Fig. 9, the ring is shown in its normal unworn condition; whereas, in Fig. 10, the ring has been worn down so that the flanges are relatively thin. In the construction shown in these two figures, the flanges of the segments are each provided with an exterior channel such as that shown and described in connection with Figures 6 and 7. They are also provided with openings 15, 15a extending from the channels to the under face of the flange. In addition to such openings, one of these segments, say the left hand one shown in Figs. 9 and 10 and denoted by 3d, is provided with a plurality of transversely extending openings 17, said openings normally lying inwardly of the outer surface of the piston, so that their outermost ends are normally closed by the adjacent laterally disposed wall of the piston ring groove.

The inner ends of said openings 17 terminate in a channel 18 produced by recessing the oppositely disposed walls of the segments 3d and 3e, said channel at its lower end terminating in the channel which is formed within the segments to receive the segment restraining element 19.

Formed in the upper portion of the segments 3e, is a series of openings 17a, said openings extending laterally through the body of the segments and opening into the upper portion of the channel 18 and likewise lying in a plane which permits their outer ends to open into the space between the lower face of the flange and the adjacent piston wall on the pressure side of the piston.

As above indicated, passage of steam through the openings 17, 17a and the intermediate chamber or recess portion 18, is precluded by the fact that the openings 17 lie within the groove and, consequently, are closed off at one end by the wall of the groove. Steam passing into the openings 17a and the chamber 18 tends, however, to expand the ring laterally and cause the segments to make close contact with the walls of the groove. When, however, the rings become worn, as is indicated in Fig. 10, and in order to preclude their breaking down prior to replacement, they may be relieved from full steam pressure by permitting the steam to then pass into the openings 17a, chamber 18 and out through openings 17, the outer ends of which latter are then in communication with the cylinder space.

The recesses formed in the adjacent side walls of the segments to produce the chamber or reservoir 18 may be continuous throughout the series of segments. While I have shown the channels in the cylinder-contacting face of the segments with the openings extending therefrom through the flanges, in Figs. 9 and 10, their presence insofar as the operation and function of the openings 17, 17a and chamber 18 is concerned is not essential.

In Fig. 11, the ring is shown in place within a groove which has become tapered or outwardly flaring, and the outer edges and the adjacent portions of the body of the piston have been peened, as at o, by the constant hammering of the piston ring or segments against said edges. It will be noted that the upwardly extending or inclined under face of each of the flanges under such conditions, finds a fair bearing upon the underlying peened portion of the piston and thus breakage is minimized. Moreover, even though the segments may tilt or flare apart, as shown in said figure, they cannot roll out of the groove by reason of the fact that the restraining element 19 holds them in place, this against the outward action of the expander spring 12 mounted under the ring segments in the groove 11. Those portions of the surfaces of the segments which have been worn away are indicated in dotted lines in said figure.

It is to be noted that in the various forms of the ring, the segments are interchangeable throughout. However, where the grooves or channels 14 stop short of the ends of the segments, such segments are not interchangeable with those where the grooves are continuous, and preferably all of the segments of any given ring would have similar exterior grooves formed therein.

It is thought that from the foregoing the operation of the ring in its various forms will be clearly appreciated. It might be well to state, however, that this type of packing ring is particularly applicable to steam locomotives and that they may be readily installed in a piston even when a locomotive is upon the road, and this by the ordinary mechanic; no special tools or fitting being required.

By the utilization of the restraining and/or retaining member, such as heretofore described, which is housed within the channel formed by the grooves in the opposite disposed series of segmental elements, the segments will be prevented from moving outwardly independently of each other to too great an extent even when forced outwardly or radially by the underlying expander spring. In other words, the restraining element acts in a sense as an equalizer to maintain the segments in proper position throughout, while still permitting them to accommodate themselves to the inaccuracies and changes in diameter and contour in a cylinder.

The restraining member has the further function of permitting the segments to move over a cut-out formed in a cylinder, without catching upon the margin of such cut-out.

It is to be understood that the restraining element or band has no function to move the segments but merely acts to properly position them with reference to each other and to the piston groove in which they may be mounted, and also insures that the body portion thereof will not be thrown out of the groove when the groove becomes unduly worn and the flanges of the segments reduced or broken off.

I am aware that it is not new to produce a packing ring of two series of segments, the segments of each series standing end to end and the two series lying in facewise relation, and having spring means underlying the various segments or extending through the body thereof, and acting to move the various segments outwardly in a radial direction into contact with a cylinder surface.

I am not aware, however, of a ring wherein there are two series of segments standing in facewise relation and associated with means for forcing the segments radially, together with means for restraining and retaining the various segments in proper relation to each other and to the surface with which they are designed to contact.

What is claimed is:

1. A packing ring comprising two series of cylinder contacting segmental sections, the sections of each series standing end to end and the opposing faces of the sections throughout the series having laterally extending arcuate mating grooves; an essentially non-resilient restraining member mounted in a channel formed by the grooves for maintaining the sections in assembled relationship, the various segmental sections being free to move to a limited extent with reference to said restraining member; and resilient means independent of the restraining member acting on all of said segments for urging them in a radial direction.

2. A ring as set forth in claim 1, wherein the restraining member is attached to a pair of oppositely disposed segments, one in each series, whereby the segments of both series are held against endwise movement throughout and rotation of one series with reference to the other is precluded.

3. A ring as set forth in claim 1, wherein the joints between the segments of one series are staggered with reference to those of the other, and the restraining element is attached to one segment of each series, whereby the joints of the two series are held out of registry.

4. A ring as set forth in claim 1, wherein the restraining member is produced from a strip of metal and has a cross section similar to but smaller than that of the channel in which it is mounted.

5. A packing ring comprising two series of arcuate segmental cylinder-contacting sections, the sections of each series standing end to end and the two series being oppositely disposed in facewise relation, and the opposing faces of the sections throughout the series having laterally extending arcuate mating grooves; and an essentially non-resilient restraining member mounted in the channel formed by the grooves, the various segmental sections being free to move to a limited extent with reference to said restraining member and each other.

6. A packing ring comprising two series of cylinder-contacting elements, the elements of each series standing end to end and the two series being oppositely disposed in facewise relation; a flange extending laterally from the upper side face of each of said elements, the under face of said flange inclining upwardly toward the outer edge of the flange, each of said elements in its outer face having a groove or channel formed therein, there being a plurality of openings extending from the channels through the flanges and opening beneath the same, and the opposing faces of the elements of the two series having laterally extending arcuate mating grooves; and an essentially non-resilient restraining member mounted in the channel formed by the grooves, the various elements being free to move to a limited extent with reference to said restraining member and each other.

7. A packing ring comprising two series of arcuate segmental cylinder-contacting elements, the elements of each series standing end to end and the two series being oppositely disposed in facewise relation; a flange extending laterally from the upper side face of each of said segmental elements, the cylinder-contacting face of each element having a channel formed therein, there likewise being a series of openings extending from the channels thus formed and terminating in a chamber formed between the segments; an essentially non-resilient restraining member mounted in said chamber for maintaining the segmental elements in assembled relationship, the various segmental elements being free to move to a limited extent with reference to said restraining member; and resilient means independent of the restraining member acting on all of said segmental elements for urging them in a radial direction.

8. A packing ring comprising two series of arcuate segmental elements standing end to end and in facewise relation, each segment having a channel formed in its outer bearing face and likewise in the adjacent side faces of the two series forming an annular chamber within the body of the ring; a plurality of openings connecting the channels in the outer bearing faces and the chamber; and an essentially non-resilient restraining member mounted in the chamber formed by the two channels in the side faces of the segments, the various segments being free to move to a limited extent with reference to said restraining member and each other.

9. A packing ring comprising two series of cylinder contacting segmental sections, the sections of each series standing end to end and the opposing faces of the sections throughout the series having axially extending mating arcuate grooves; a restraining member consisting of a strip of essentially non-resilient, flexible metal mounted in the channel formed by the grooves and bearing upon the various segments throughout each of the series, said member acting to equalize the movements of the segmental sections in a radial direction; and means acting on said segments independent of the restraining member for moving them in a radial direction.

10. A structure as set forth in claim 9, wherein the restraining member is produced from a strip of annealed steel, and the means for forcing the segments radially comprises a spring substantially polygonal in outline, said spring bearing alternately upon the inner surface of the segments and the opposite face of a groove or channel in which the segments are mounted.

11. A packing ring comprising two series of cylinder contacting segmental sections, the sections of each series standing end to end; a spring acting to move said segments in a radial direction and into contact with the surface with which they form a seal; and essentially non-resilient, restraining means common to and coacting with each and all of said segments and serving at all times to prevent undue movement of one segment with reference to the other.

ALLEN W. MORTON.